Jan. 3, 1928.　　　　　R. S. BLAIR　　　　　1,654,915
METER
Filed Nov. 5, 1920　　　　2 Sheets-Sheet 1

Robert S. Blair, Inventor

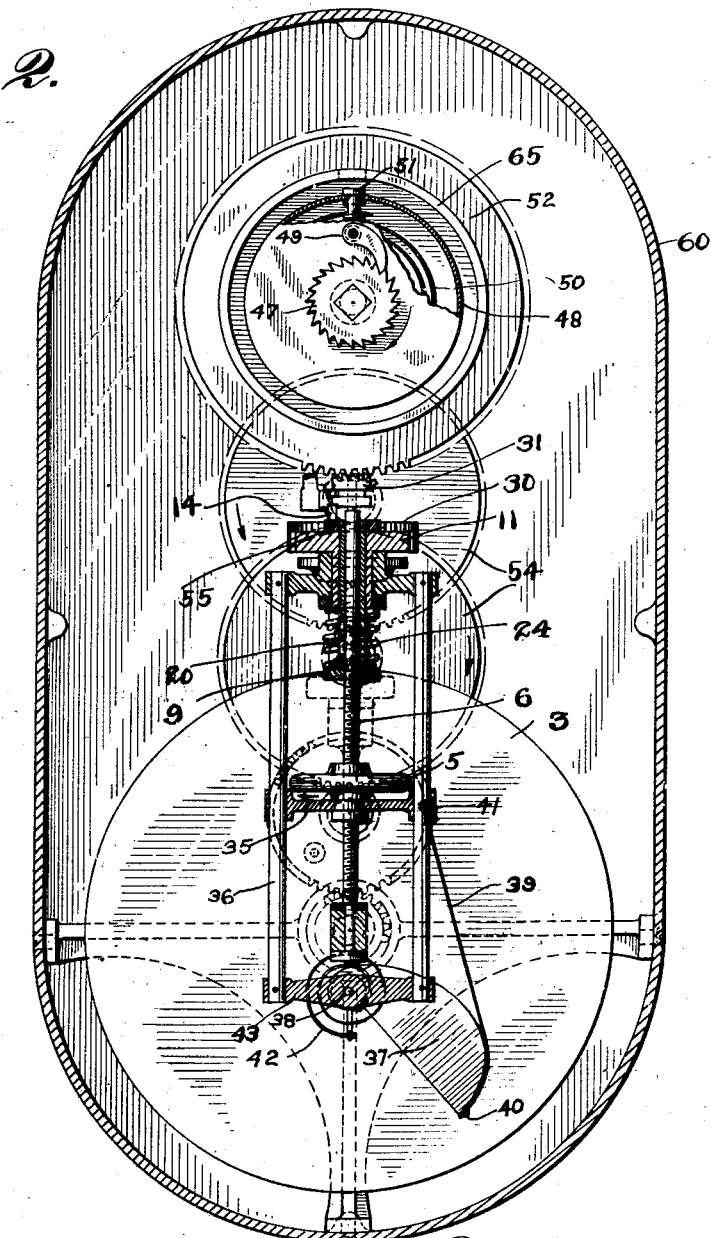

Patented Jan. 3, 1928.

1,654,915

UNITED STATES PATENT OFFICE.

ROBERT S. BLAIR, OF SOUND BEACH, CONNECTICUT.

METER.

Application filed November 5, 1920. Serial No. 421,955.

This invention relates to meters and with regard to certain features, more particularly to speed meters. One of the objects thereof is to provide a meter of simple and practical construction and efficient action. Another object is to provide apparatus of the above nature whereby the correct rate of rotation of a variably driven element may at all times be readily determined, in which the results obtained are substantially independent of the load upon the driven member whose rate of rotation is to be determined. Another object is to provide a simple and effective device of the above character, in which certain predetermined errors are automatically corrected. Other objects will be in part obvious or in part pointed out hereinafter.

The invention accordingly consists in the features of construction, combinations of elements, and arrangements of parts which will be exemplified in the structure to be hereinafter described and the scope of the application of which will be indicated in the following claims.

In the accompanying drawing, in which is shown one of the various embodiments of this invention, Figure 1 is a vertical, sectional elevation;

Figure 2 is a sectional view, the section being taken substantially along the line 2—2 of Figure 1 and viewed in the direction indicated by the arrows.

Similar reference characters refer to similar parts throughout the several views of the drawing.

Figures 1, 3:
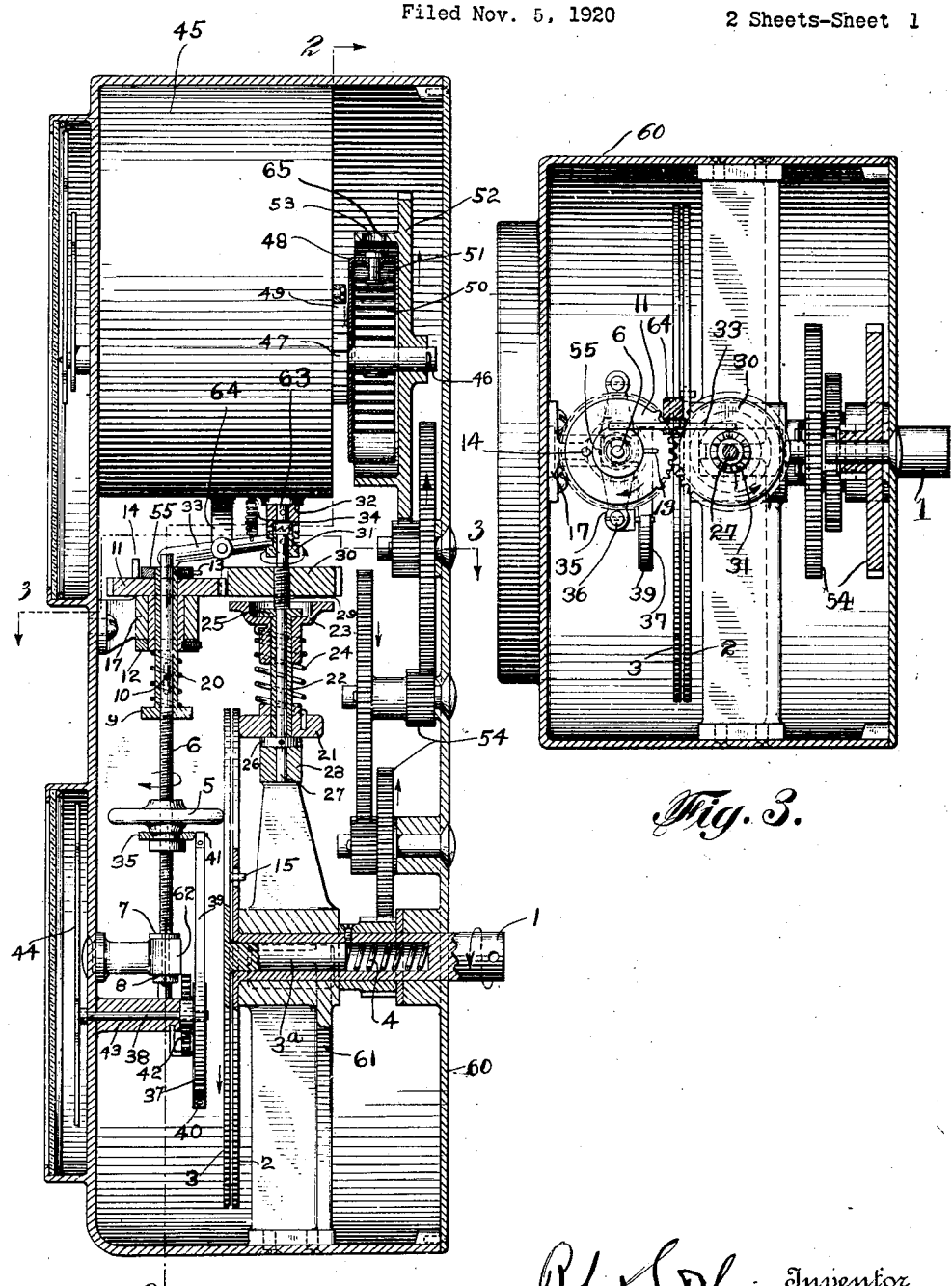
Figure 3 is a sectional view, the section being taken substantially along the line 3—3 of Figure 1 and viewed in the direction indicated by the arrows.

Referring now to the drawings in detail, and first to Figure 1, there is shown a casing 60 within which the meter mechanism is mounted. A shaft 1 supported in a suitable bracket 61 within the casing 60 and projecting therefrom is connected by means of a flexible cable or other connection to the member whose speed of rotation is to be measured. Secured to the inner end of the shaft 1 and preferably integral therewith is a friction disk 2. Concentric with the disk 2 is a second friction disk 3, supported by a hub 3ª projecting into a longitudinal recess in the shaft 1. The disk 3 is driven from the disk 2 through a pin 15 and is urged in a direction away from the disk 2 by means of a spring 4 bearing against the hub 3ª as shown.

In engagement with the friction disk 3 is a friction roller 5, which is threaded upon a shaft 6. The shaft 6, at its lower end is journaled in a bearing 62 and is restrained from axial movement by thrust collars 7 and 8. Upon the upper portion of the shaft 6 is slidably mounted a sleeve 9. A pin 10 in the shaft 6, engaging a slot in the sleeve 9, connects the shaft 6 and the sleeve 9 in rotary driving relation permitting relative axial movement thereof. Journaled about the sleeve 9 and rotatable in a lug 17 is a gear 11 which is held against axial movement relative to the lug 17 by a thrust collar 12. Secured to the upper end of the sleeve 9, above the gear 11, is a thrust collar 55, which limits the downward movement in an axial direction of the sleeve 9. A spring 20 interposed between the lower portion of the sleeve 9 and the thrust collar 12, which is secured to the gear 11 serves always to urge the sleeve 9 downwardly to draw the thrust collar 55 against the upper surface of the gear 11, as shown. Mounted in the upper surface of the gear 11 is a pin 14 in position to be engaged by a pin 13 secured to the thrust collar 55, when the parts are in the relative positions shown in the drawing. A rotation of the gear 11 through the engagement of the pins 14 and 13 rotates the sleeve 9 which through the pin 10 causes a rotation of the shaft 6. An upward movement of the sleeve 9 upon the shaft 6, raising the thrust collar 55 and the pin 13 therewith, will bring the pin 13 to such position as not to be engaged by the pin 14, whereupon the shaft 6 will be no longer affected by rotation of the gear 11. It will be seen further that a movement of the friction wheel 5 upwardly along the threaded shaft 6 until it is in engagement with the friction disk 3 substantially at the periphery of the latter will result in the engagement of the hub of the wheel 5 with the lower surface of the sleeve 9, whereby the sleeve 9 will be urged upwardly against the action of the spring 20 and the driving connection between the pins 14 and 13 will be broken.

Rotatably mounted in the upper portion of the support 61 is a vertical shaft 27 provided with a thrust collar 26 bearing upon the upper portion 28 of the support 61. Loosely mounted upon the shaft 27 and resting upon collar 26 is a sleeve 22 which is provided with a flanged upper end 25. A friction wheel 21 in frictional engagement with the disk 2 has a bearing upon the sleeve 22 and is connected by a spring 24 with a friction clutch member 23, the clutch member 23 being urged away from the wheel 21 and against the flange 25 of the sleeve 22 by the action of the spring 24. The shaft 27 is provided with a portion 29 of enlarged diameter against the lower end of which the flange 25 bears and upon which is threaded a gear 30, adapted to engage the gear 11 above described.

Mounted in the upper portion of the casing 60 is a clock mechanism 45, the constantly driven shaft 63 of which is provided at its lower end with a clutch member 32. Splined upon the upper end of the shaft 27 is a clutch member 31, adapted to engage the clutch member 32 and connect the shaft 27 in driving relation with the constantly driven clock mechanism. Pivoted upon a suitable lug 64 is a lever 33, one end of which is pivotally connected to the clutch member 31, and the other end of which rests upon the thrust collar 55 of the sleeve 9 before described. A spring 34 urges the clutch member 31 upwardly into engagement with the clutch member 32 and it will be seen that an upward movement of the thrust collar 55 through the action of the lever 33 and against the action of the spring 34 will disengage the two clutch members 31 and 32.

Referring now to Figure 2, there is mounted upon the friction roller 5, a yoke 35 which is adapted to slide in vertical guides 36. As may be seen in Figure 1, rotatably mounted in a lug 43 is a spindle 38 upon the outer end of which exterior of the casing 60 is mounted a pointer 44. A cam shaped disc 37 is mounted on shaft 38 and has wrapped about its edge a metallic ribbon 39, one end of which is fastened to the cam 37, as at 40, and the other end of which is fastened to the yoke 35, as at 41. The ribbon 39 is held taut by a spring 42, which is connected between the disc 37 and the lug or journal 43. A movement up or down of the friction roller 5 upon the threaded shaft 6 through the ribbon 39 causes a movement of the cam 37 which results in a movement of the spindle 38 and the indicator needle 44 connected thereto.

Mounted upon the main drive shaft 46 of the clock 45, so as to turn independently of the shaft, is a spring case 48, to which is connected a ratchet 47, the ratchet 47 being prevented from rotation in one direction by a pawl 49 secured to the clock casing, as shown in Figure 2. The driving spring 50 is coiled within the casing 48 and is fastened at its inner end to the main driving shaft 46 of the clock, and at its outer end to a pin 51 which pin slides through an opening in the casing 48. Loosely mounted upon the shaft 46 is a gear 52, which has a flanged portion 65 projecting about the spring casing 48. The gear 52 is connected through a suitable train of gears 54 to the driving shaft 1, as is clearly shown in Figure 1. Thus as the shaft 1 is rotated, being driven by the rotating member whose speed is to be measured, the gear 52 is rotated upon the shaft 46. It will be seen that when the main driving spring 50 of the clock 45 is sufficiently unwound by the continual running of the clock, the pin 51 will project through the casing 48 to a sufficient extent to engage an opening 53 in the flanged portion 65 of the gear 52, whereby the spring 50 will be automatically rewound.

Considering now the operation of the apparatus, the friction disks 2 and 3 are driven by the shaft 1 from the member whose speed of revolution is to be measured. The friction roller 21, in frictional contact with the disk 2, is driven at a variable speed, in accordance with the speed of rotation of the shaft 1. The shaft 27 is driven at a uniform rate of rotation by the clock 45 and the gear 30, threaded upon the shaft 27 rotates therewith. Gear 30, being in engagement with the gear 11 and tending thereby to lag in respect to the shaft 27, moves downwardly along the threaded portion of the shaft 27 until it engages the friction clutch member 23. The clutch member 23 is driven from the friction roller 21 through the spring 24. Upon the gear 30 coming into contact with the clutch member 23 therefore the gear 30 draws the necessary power from the clutch member 23 to be accelerated until its speed of rotation is equal to that of the shaft 27. Assuming that the parts rotate in the direction indicated by the arrows in Figure 1, the shaft 27 is provided with a right hand thread in engagement with the gear 30 to bring about the above result. Thus the gear 30 is rotated at a uniform rate by the clock mechanism and the auxiliary source of power provided by the friction clutch member 23.

The gear 30 rotates the gear 11 at a uniform rate and the sleeve 9 is rotated with the gear 11 through the engagement of the pins 14 and 13. The rotation of the sleeve 9 through the pin connection 10 rotates the shaft 6 likewise at a uniform rate. The roller 5 is driven at a variable speed of rotation, in accordance with the variations in speed of the shaft 1 through its frictional engagement with the friction disk 3. If the roller 5 is thereby caused to rotate with greater angular velocity than the rate of rotation of the shaft 6, upon which it is threaded, the roller 5 advances along the shaft 6 toward the center of the disk 3 until its speed of rotation is equal to that of the uniformly driven shaft 6.

As the roller 5, and consequently the yoke 35 advances toward the center of the disk 3, as above described, the slack resulting in the metallic ribbon 39 is taken up by the spring 42, which revolves the shaft 38 winding up the ribbon 39 on the surface of the cam shaped disk 37. The needle 44, mounted upon the shaft 38, indicates upon a suitable scale the new speed of rotation of the shaft 1.

If the speed of rotation of the shaft 1 and consequently of the friction disk 3 decreases, the roller 5 tends to revolve at a slower speed than the uniformly driven shaft 6 and advances along the shaft 6 away from the center of the disk 3 until the speed of rotation of the roller 5 is again equal to that of the shaft 6. When the speed of rotation of the shaft 1 has fallen to a certain degree, as determined by the construction of the apparatus, the roller 5 will have advanced along the shaft 6 until it has come into contact with the sleeve 9. A further movement of the roller 5, which in the construction shown in the drawing would be substantially to the periphery of the disk 3, the sleeve 9 is forced upwardly, the spring 20 being compressed thereby. This movement of the sleeve 9, as will be seen, raises the thrust collar 55 so that the pin 13, mounted thereon is raised to a height above the level of the top of the pin 14. This disengagement of the pins 13 and 14 from driving relation breaks the driving connection between the shaft 6 and its source of power, so that the rotation of the shaft 6 ceases. When the rotation of the shaft 1 and consequently of the disk 3 ceases, the roller 5 will therefore be at the uppermost position of its travel upon the shaft 6 and the pins 14 and 13 will be out of driving relation so that the shaft 6 is also at rest.

The upward movement of the sleeve 9 and the thrust collar 55 breaking the driving connection between the pins 14 and 13, as above described, also draws the clutch member 31 out of engagement with the clutch member 32 through the action of the lever 33. The driving relation between the shaft 27 and the clock mechanism is, therefore, broken when the shaft 6 comes to rest. When the rotation of the shaft 1 has stopped therefore, the clutch members 31 and 32 are out of engagement, the pins 14 and 13 are out of driving relation, and the roller 5 is near the periphery of the disk 3, holding the sleeve 9 up against the action of the spring 20.

Now upon the shaft 1 again starting to rotate, the roller 5 will move along the shaft 6 toward the center of the disk 3. This movement of the roller 5 releases the sleeve 9, permitting it to slide downwardly under the action of the spring 20 and this movement of the sleeve 9 brings the pins 13 and 14 again into position for driving relation. The same downward movement of the sleeve 9 through the action of the lever 33 urged by the spring 34 brings the clutch members 31 and 32 again into engagement. The shaft 27 now being driven from the clock mechanism and the shaft 6 being connected in driving relation with the gear 30, the parts will operate as has been described until a state of equilibrium between the rotation of the roller 5 and the shaft 6 has been attained. The pointer 44 indicates the speed of the shaft 1 corresponding to each position of the roller 5 upon the shaft 6.

From the above, it will be seen that there is herein provided an apparatus which embodies the features of this invention and attains the objects thereof, and that the same is well adapted to meet the conditions of practical use.

As various possible embodiments might be made of the above invention and as various changes might be made in the embodiment above set forth, it is to be understood that all matter herein set forth or shown in the accompanying drawing is to be interpretated as illustrative and not in a limiting sense.

Having described my invention, what I claim as new and desire to secure by Letters Patent of the United States is:

1. In meter construction, in combination, a friction disk rotated at a variable speed, a rotatable spindle extending transversely to the axis of said disk, a wheel mounted upon said spindle and adapted to make frictional engagement with said disk at a variable distance from the axis thereof to be rotated thereby, non-slipping means independent of said disk adapted to positively rotate said spindle at a constant uniform rate irrespective of the speed of said wheel, a connection between said spindle and said wheel adapted to produce a relative axial movement thereof upon a relative rotary movement and means adapted to disconnect said independent means from said spindle as said wheel reaches the extreme of its axial movement.

2. In meter construction, in combination, a friction disk rotated at a variable speed, a rotatable spindle extending transversely to the axis of said disk, a wheel mounted upon said spindle and adapted to make frictional engagement with said disk at a variable distance from the axis thereof to be rotated thereby, means independent of said disk adapted to rotate said spindle at a constant uniform rate, a connection between said spindle and said wheel adapted to produce a relative axial movement thereof upon a relative rotary movement, and means actuated by said wheel adapted upon predetermined axial movement thereof relative to said spindle to disconnect said independent uniform drive of said spindle.

3. In meter construction, in combination, a member rotated at a variable speed, a member adapted to rotate about an axis transverse to the axis of said first member and adapted to make frictional engagement therewith at a variable distance from the axis thereof, a shaft upon which said second member is mounted, a connection between said shaft and said member thereon adapted to produce a relative axial movement thereof upon relative rotary movement, clockwork, driving means adapted to rotate said shaft from said clockwork at a substantially constant speed, and means acting through said driving means adapted to assist said clockwork to maintain said constant speed of said shaft when the latter tends to lag.

4. In meter construction, in combination, a member rotated at a variable speed, a member adapted to rotate about an axis transverse to the axis of said first member and adapted to make frictional engagement therewith at a variable distance from the axis thereof, a shaft upon which said second member is mounted, a connection between said shaft and said member thereon adapted to produce a relative axial movement thereof upon relative rotary movement, clockwork, driving means adapted to rotate said shaft from said clockwork at a substantially constant speed, means acting through said driving means adapted to assist said clockwork to maintain said constant speed of said shaft, and means for rendering said last means ineffective when said clockwork maintains said constant speed of said shaft.

5. In meter construction, in combination, a member rotated at a variable speed, a friction disk rotated from said member, a member adapted to rotate about an axis transverse to the axis of said disk and adapted to make frictional engagement therewith at a variable distance from the axis thereof, a shaft upon which said last member is mounted, a connection between said shaft and said member adapted to produce a relative axial movement thereof upon relative rotary movement, clockwork, driving means adapted to rotate said shaft from said clockwork at a substantially constant speed, and means acting through said driving means and driven from said first variably rotated member adapted to assist said clockwork to maintain said constant speed of said shaft when the latter tends to lag.

6. In meter construction, in combination, a member rotated at a variable speed, a friction disk rotated from said member, a member adapted to rotate about an axis transverse to the axis of said disk and adapted to make frictional engagement therewith at a variable distance from the axis thereof, a shaft upon which said last member is mounted, a connection between said shaft and said member adapted to produce a relative axial movement thereof upon relative rotary movement, clockwork, driving means adapted to rotate said shaft from said clockwork at a substantially constant speed, a connection between said driving means and said first variably rotated member for driving said shaft in conjunction with said clockwork, and means for breaking said connection when said clockwork maintains said constant speed of said shaft.

7. In meter construction, in combination, a member rotated at a variable speed, a member adapted to rotate about an axis transverse to the axis of said first member and adapted to make frictional engagement therewith at a variable distance from the axis thereof, a shaft upon which said second member is mounted, a connection between said shaft and said member thereon adapted to produce a relative axial movement thereof upon relative rotary movement, clockwork, driving means adapted to rotate said shaft from said clockwork at a substantially constant speed, and auxiliary source of power adapted to assist said clockwork to maintain said constant speed of said shaft, and means adapted upon predetermined relative axial movement between said shaft and said member mounted thereon to disconnect both said clockwork and said auxiliary source of power from said shaft.

8. In meter construction, in combination, a member rotated at a variable speed, means for indicating the variations in the speed of said member including a shaft adapted to be rotated at a uniform rate of speed, clockwork, driving means adapted to rotate said shaft from said clockwork, and an auxiliary source of power acting through said driving means adapted to assist said clockwork to maintain said constant speed of said shaft when said shaft tends to lag.

9. In meter construction, in combination, a member rotated at a variable speed, means for indicating the variations in the speed of said member including a shaft adapted to be rotated at a uniform rate of speed, clockwork, driving means adapted to rotate said shaft from said clockwork, and means acting through said driving means adapted to drive said shaft from said variably rotated member in conjunction with said clockwork to maintain said constant speed of said shaft when said shaft tends to lag.

10. In meter construction, in combination, a member rotated at a variable speed, means for indicating the variations in the speed of said member including a shaft adapted to be rotated at a uniform rate of speed, clockwork, driving means adapted to rotate said shaft from said clockwork, an auxiliary source of power acting through said driving means adapted to assist said clockwork to maintain said constant speed of said shaft when said shaft tends to lag, and means adapted to disconnect from said shaft the drive of both said clockwork and said auxiliary source of power when the rotation of said variably rotated member ceases.

11. In meter construction, in combination, a member rotated at a variable speed, means for indicating the variations in the speed of said member including a shaft adapted to be rotated at a uniform rate of speed, clockwork, a gear adapted to be driven from said clockwork and connected to rotate said shaft, an auxiliary source of power adapted to drive said gear to assist said clockwork to maintain said constant speed of said shaft when said shaft tends to lag, and means adapted to disconnect said gear from said clockwork when the rotation of said variably rotated member ceases.

12. In meter construction, in combination, a member rotated at a variable speed, means for indicating the variations in the speed of said member including a shaft adapted to be rotated at a uniform rate of speed, clockwork, a gear adapted to be driven from said clockwork and connected to rotate said shaft, an auxiliary source of power adapted to drive said gear to assist said clockwork to maintain said constant speed of said shaft when said shaft tends to lag, and means adapted when the rotation of said variably driven member ceases to break the driving connection between said gear and said shaft.

13. In meter construction, in combination, a member rotated at a variable speed, means for indicating the variations in the speed of said member including a shaft adapted to be rotated at a uniform rate of speed, clockwork, driving means adapted to drive said shaft from said clockwork, an auxiliary source of power, and means including a clutch mechanism adapted to connect said auxiliary source of power with said driving means to drive said shaft in conjunction with said clockwork when said shaft tends to lag behind said constant speed.

14. In meter construction, in combination, a friction member rotated at a speed proportional to the function to be measured, a friction member in engagement therewith and driven thereby and adapted to coact with the same at a variable distance from its axis, a shaft upon which said second member is mounted, connecting means between said shaft and said second member adapted upon relative rotary movement between the same to cause said second member to move into engagement with different parts of said first member, clockwork, non-slipping means adapted to drive said shaft from said clockwork at a constant and uniform rate irrespective of the speed of said second member, and a device positioned and connected to free said clockwork from said shaft upon said second member reaching a limit of its axial travel on said shaft.

In testimony whereof, I have signed my name to this specification this 3rd day of November, 1920.

ROBERT S. BLAIR.